United States Patent
Tagore

(10) Patent No.: US 10,298,694 B1
(45) Date of Patent: May 21, 2019

(54) FLOW TIMEOUT CONTROL WITHIN A NETWORK

(71) Applicant: Juniper Networks, Inc., Sunnyvale, CA (US)

(72) Inventor: Kalyana Prakash Ravindranath Tagore, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 381 days.

(21) Appl. No.: 14/321,135

(22) Filed: Jul. 1, 2014

(51) Int. Cl.
*H04L 29/08* (2006.01)

(52) U.S. Cl.
CPC .................. *H04L 67/145* (2013.01)

(58) Field of Classification Search
CPC .... H04L 45/026; H04L 67/104; H04L 47/286
See application file for complete search history.

(56) References Cited

U.S. PATENT DOCUMENTS

| | | | |
|---|---|---|---|
| 7,184,437 B1 | 2/2007 | Cole et al. | |
| 7,729,357 B2* | 6/2010 | Strater | H04L 12/2697 370/241.1 |
| 8,050,559 B2 | 11/2011 | Sindhu | |
| 8,190,701 B2* | 5/2012 | Luna | H04L 67/04 709/213 |
| 8,339,959 B1 | 12/2012 | Moisand et al. | |
| 8,650,279 B2 | 2/2014 | Mehta et al. | |
| 8,806,250 B2* | 8/2014 | Gatta | G06F 1/3209 455/574 |
| 2007/0233855 A1* | 10/2007 | Brown | H04L 43/10 709/224 |
| 2009/0073990 A1* | 3/2009 | Patil | H04L 45/00 370/396 |
| 2010/0281118 A1* | 11/2010 | Donahue | H04L 67/145 709/206 |
| 2010/0325306 A1* | 12/2010 | Vimpari | H04L 29/12471 709/233 |
| 2012/0030280 A1* | 2/2012 | Wang | H04L 12/4633 709/203 |

(Continued)

FOREIGN PATENT DOCUMENTS

WO 2012150473 A1 11/2012

OTHER PUBLICATIONS

RFC 5482 TCP User timeout Option, Mar. 2009 (Year: 2009).*

(Continued)

*Primary Examiner* — Joe Chacko
(74) *Attorney, Agent, or Firm* — Shumaker & Sieffert, P.A.

(57) ABSTRACT

In general, techniques are described for performing flow timeout control within a network. A device comprising a processor may be configured to perform the techniques. The processor may be configured to, as one example, determine, from a first packet of a packet flow, a minimum timeout value for the packet flow indicative of a time duration during which a first computing device will not send a keep-alive message to prevent the packet flow from timing out. The processor may then determine an intermediate timeout value for the packet flow based on a comparison of the minimum timeout value to a maximum timeout value, and specify the intermediate timeout value in a second packet of the packet flow sent by the second network device to the first network device in response to the first packet.

20 Claims, 11 Drawing Sheets

(56) References Cited

U.S. PATENT DOCUMENTS

| | | | | |
|---|---|---|---|---|
| 2012/0110173 | A1* | 5/2012 | Luna | H04L 69/28 709/224 |
| 2013/0003634 | A1* | 1/2013 | Backholm | H04L 43/0811 370/311 |
| 2013/0007484 | A1* | 1/2013 | Gobriel | G06F 1/3209 713/320 |
| 2014/0226562 | A1* | 8/2014 | Shah | H04W 76/045 370/328 |
| 2015/0256440 | A1* | 9/2015 | Jeong | H04L 67/141 370/329 |
| 2015/0365325 | A1* | 12/2015 | Hwang | H04L 47/12 370/230 |

OTHER PUBLICATIONS

Eggert et al. "TCP User Timeout Option" Network Working Group, RFC 5482, Mar. 2009, 14 pgs.
Price et al. "Adapting to NAT timeout values in P2P Overlay Networks" proceeding of: 24th IEEE International Symposium on Parallel and Distributed Processing, IPDPS 2010, Apr. 19-23, 2010, 7 pgs.
Postel, J. "User Datagram Protocol" RFC 768, ISI, Aug. 28, 1980, 3 pgs.
"Transmission Control Protocol" Darpa Internet Program, Protocol Specificaiton, RFC 793, Sep. 1981, 85 pgs.
Wouters et al. "The edns-tcp-keepalive EDNS0 Option draft-ietf-dnsop-edns-tcp-keepalive-00" Internet-Draft, Apr. 11, 2014, 10 pgs.

* cited by examiner

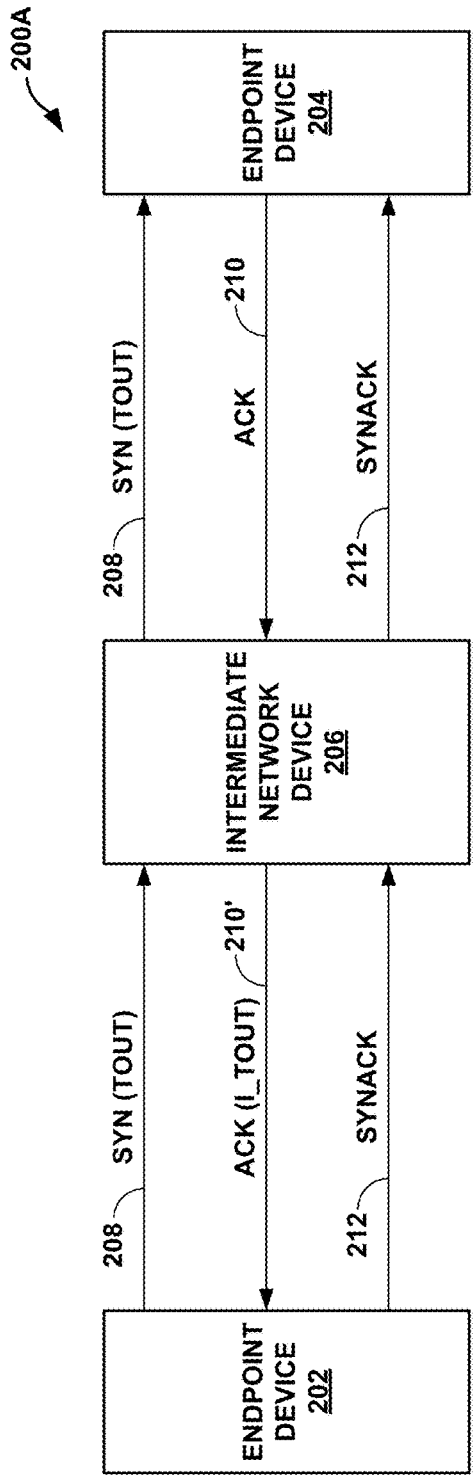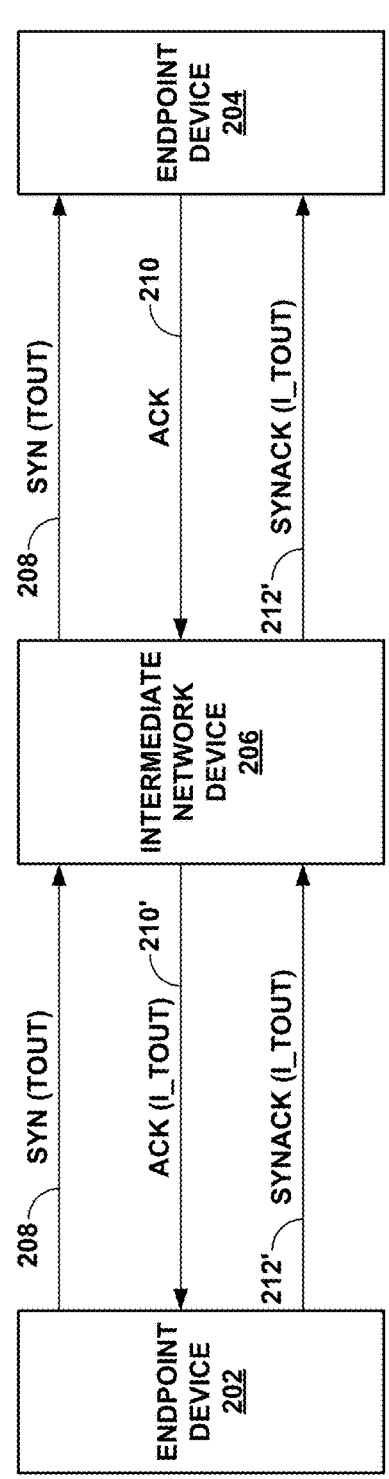
FIG. 4A
FIG. 4B

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | | Destination port | | | | | | | | | | | | | | | |
| 4 | 32 | Sequence number | | | | | | | | | | | | | | | | | | | | | | | | | | | | | | | |
| 8 | 64 | Acknowledgment number (if ack set) | | | | | | | | | | | | | | | | | | | | | | | | | | | | | | | |
| 12 | 96 | Data offset | | | | Reserved 0 0 0 | | | | N S | C W R | E C E | U R G | A C K | P S H | R S T | S Y N | F I N | Window Size | | | | | | | | | | | | | | | |
| 16 | 128 | Checksum | | | | | | | | | | | | | | | | Urgent pointer (if URG set) | | | | | | | | | | | | | | | |
| 20 | 160 | TOUT OPTION FIELD 402A | | | | | | | | | | | | | | | | | | | | | | | | | | | | | | | |
| ... | ... | OTHER OPTION FIELDS 402B-402N | | | | | | | | | | | | | | | | | | | | | | | | | | | | | | | |

FIG. 6A

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | | Destination port | | | | | | | | | | | | | | | |
| 4 | 32 | Length | | | | | | | | | | | | | | | | Checksum | | | | | | | | | | | | | | | |
| | | TOUT FIELD 456 | | | | | | | | | | | | | | | | | | | | | | | | | | | | | | | |

FIG. 6B

FLOW TIMEOUT CONTROL WITHIN A NETWORK

TECHNICAL FIELD

This disclosure relates to computer networks, and more particularly, to techniques for controlling timeout of a packet flow within a network.

BACKGROUND

A computer network is a collection of interconnected computing devices that exchange data and share resources. Example computing devices include media servers, desktop computers, laptops, workstations, PDAs, wireless devices, network-ready appliances, file servers, print servers or other devices. End user computing devices may run one or more applications, such as mobile calls, video games, videoconferencing, and email, among others.

In a packet-based network the computing devices communicate data using communication sessions for which the data is divided into small blocks called packets and transmitted through the network. Intermediate devices within the network, such as routers, switches, gateways, network address translation (NAT) devices, firewalls, intrusion detection and protection (IDP) devices, provide infrastructure for transporting and processing the packets as the packets flow through the network. In this way, the packets may be individually routed across the network from a source device to a destination device. The destination device extracts the data from the packets and assembles the data into its original form.

In certain applications, such as voice over Internet protocol (VoIP) applications, online gaming applications, file transfer applications and/or other peer-to-peer (P2P) applications, there may be delay in communicating packets due to user inactivity, buffering or other reasons. These delays may, unless some mechanism is provided, result in a timeout of network sessions supporting transport of data for these types of applications, which can lead to interruptions in the application execution due to reestablishment of the underlying network session. To avoid these delays, the network devices hosting the applications may periodically send so-called "keep-alive" messages to prevent the network session from timing out (or, in other words, keep the network session alive). These keep-alive messages may, in some contexts, consume significant resources, especially for mobile devices operating with limited power (e.g., due to the use of a battery). Various protocols, such as a port control protocol (PCP), may reduce the number of keep-alive messages that are required to be sent, but often at the expense of additional network architecture (in the form of a dedicated PCP server for example) while also requiring full adoption of yet another protocol, i.e., PCP in this example, by all of the network devices throughout the entire network.

SUMMARY

In general, this disclosure describes techniques by which end-user device are able to control flow timeout values applied by intermediate devices when processing network connections within a network. The techniques described in this disclosure leverage and enhance layer four transport protocols, such as a transmit control protocol (TCP) and a user datagram protocol (UDP), to facilitate specification and automated negotiation of a minimum timeout value indicative of a minimum amount of time that a timeout that a session or flow is to be considered active by intermediate device without requiring keep-alive messages by the end-point devices during times of inactivity. This minimum timeout value does not specify a maximum timeout value at which point the flow should be timed out, but rather a minimum amount of time for which the intermediate devices need not expect keep-alive messages. The techniques enable communication of this minimum timeout value on a per-flow or per-session basis to facilitate granular control of flow/session timeouts without requiring much in the way of additional overhead (in terms of servers or additional protocols separate from layer four transport protocols)).

In one aspect, a method comprises determining, by a first computing device and for a packet flow that will include data from a first instance of an application executed by the first computing device, a minimum timeout value indicative of a time duration during which the first computing device is not required to send a keep-alive message to prevent an intermediate network device positioned between the first computing device and a second computing device from timing out the packet flow. The method further comprises generating, by the first computing device, a packet of the packet flow such that the packet includes a request to the intermediate network device that the packet flow be assigned the minimum timeout value, and transmitting the packet to an application executing on the second computing device.

In another aspect, a first computing device comprises a control unit configured to determine, for a packet flow that will include data from a first instance of an application executed by the first computing device, a minimum timeout value indicative of a time duration during which the first computing device is not required to send a keep-alive message to prevent an intermediate network device positioned between the first computing device and a second computing device from timing out the packet flow and generate a packet of the packet flow such that the packet includes a request to the intermediate network device that the packet flow be assigned the minimum timeout value. The device further comprises a network interface configured to transmit the packet to an application configured to be executed by a second computing device.

In another aspect, a method comprises determining, from a first packet of a packet flow that includes data from an instance of an application executed by a first computing device, a minimum timeout value for the packet flow indicative of a time duration during which the first computing device will not send a keep-alive message to prevent the packet flow from timing out. The method further comprises determining an intermediate timeout value for the packet flow based on a comparison of the minimum timeout value to a maximum timeout value, the maximum timeout value configured for use by an intermediate network device intermediately positioned between the first computing device and a second computing device and indicative of a maximum time duration that any given packet flow is to remain active within the intermediate network device before being timed out. The method also comprises specifying the intermediate timeout value in a second packet of the packet flow sent by the second network device to the first network device in response to the first packet.

In another aspect, an intermediate network device comprises a control unit configured to determine, from a first packet of a packet flow that includes data from an instance of an application executed by a first computing device, a minimum timeout value for the packet flow indicative of a time duration during which the first computing device will not send a keep-alive message to prevent the packet flow from timing out, determine an intermediate timeout value for the packet flow based on a comparison of the minimum timeout value to a maximum timeout value, the maximum timeout value configured for use by the intermediate network device intermediately positioned between the first computing device and a second computing device and indicative of a maximum time duration that any given packet flow is to remain active within the intermediate network device before being timed out, and specify the intermediate timeout value in a second packet of the packet flow sent by the second network device to the first network device in response to the first packet.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C are block diagrams illustrating exemplary systems that may be configured to perform various aspects of the flow control timeout control techniques described in this disclosure.

FIGS. 6A and 6B are diagrams illustrating a TCP packet header and a UDP packet formed in accordance with various aspects of the flow timeout control techniques described in this disclosure.

DETAILED DESCRIPTION

Figure 1:
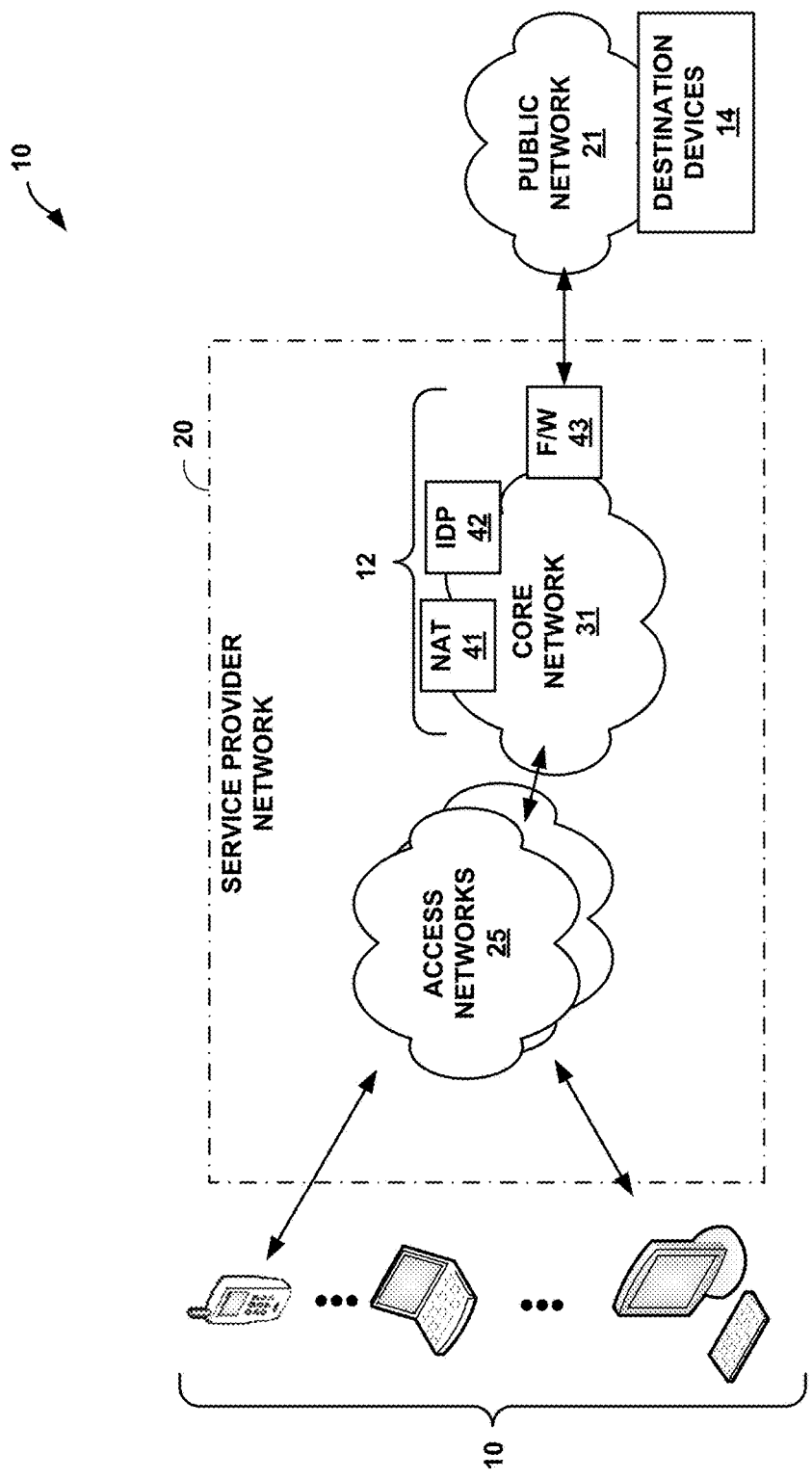
FIG. 1 is a block diagram illustrating an exemplary network system configured to perform the techniques described in this disclosure.

FIG. 1 is a block diagram illustrating an exemplary network system 10 configured to perform the techniques described in this disclosure by which an end-user device is able to control flow timeout values applied by intermediate network devices when processing network connections within a network.

As shown in the example of FIG. 1, network system 10 includes a service provider network 20 and a public network 21. Service provider network 20 may operate as a private network that provides packet-based network access to public network 21 by which endpoint computing devices 10 may communicate with destination devices 14 located in public network 21. Examples of endpoint computing devices 10 and destination device 14 include mobile phones, tablets, personal computers, laptop computers, wireless-capable netbooks, video game devices, pagers, smartphones, or personal data assistants (PDAs) or other types of computing device associated with subscribers. Each of endpoint computing devices 10 may run one or more applications, such as mobile calls, video games, videoconferencing, and email, peer-to-peer (P2P) applications, among others.

In accordance with the techniques of this disclosure, endpoint computing devices 10 may control respective timeout values applied by intermediate network devices 12, such as network address translation (NAT) device 41 or intrusion detection and prevention (IDP) device 42 and/or firewall 43 for each packet-based communication sessions associated with the endpoint computing device.

In the example of FIG. 1, intermediate network devices 12, such as NAT device 41, IDP device 42 and firewall 43, may be configured to apply stateful services to packet flows associated with endpoint computing devices 10. Moreover, as described herein, these intermediate network devices 12 determine whether a field in a modified transport control protocol (TCP) message, a user datagram protocol (UDP) message, or any other form of transport layer protocol (which may be referred to, in other words, as a layer four (L4) protocol in terms of the Open Systems Interconnection (OSI) model) from the endpoint device 10 has a value indicating a timeout value to be applied to the specified packet flow.

As one example, TCP is a layer four (L4) protocol that operates over the Internet protocol (IP) (a layer three (L3) protocol) in terms of the OSI model and that provides reliable, ordered and error-checked delivery of a stream of octets between devices. TCP has a defined sequence of messages used to establish a two way session between two devices (where this two-way session includes a packet flow from a first device to a second device and a packet flow from a second device to the first device). Typically, one of endpoint devices 10 may establish a TCP session with one of destination devices 14 in order to communicate higher layer data (e.g., typically layer seven (L7) application data) between the one of endpoint devices 10 and the one of destination devices 14. To establish this TCP session, the one of endpoint devices 10 generates and sends a so-called "SYN" packet in order to synchronize (hence, the name "SYN" for this packet) subsequent packet delivery. The one of the destination devices 14, in response to this SYN packet, may respond with a so-called "ACK" packet, acknowledging the "SYN" packet (hence, the name "ACK" for these packets) and indicating that subsequent packet delivery has been synchronized. The one of endpoint devices 10 may respond to the ACK packet with a so-called "SYN-ACK" packet, which acknowledges the synchronization and thereby the establishment of the TCP session (hence the name "SYNACK" for this packet). More information concerning TCP may be found in request for comment (RFC) 793, entitled "Transmission Control Protocol," and dated September 1981, the entire contents of which are hereby incorporated by reference as if set out in this disclosure in their entirety.

UDP is a transport layer protocol that, contrary to TCP, does not require this SYN-ACK-SYNACK handshake to establish a session. UDP is a minimal message-oriented transport layer protocol that provides a mechanism to send packets but does not ensure reliability, ordered packet delivery or duplicate protection. UDP may be considered a lightweight protocol for delivery of messages with few guarantees on message delivery other than minor data integrity measures (such as a so-called "checksum"). UDP is typically used by applications where error checking and correction is not necessary or is performed by the application. In some examples, time sensitive applications may use UDP because dropping packets is preferable to waiting for delayed packets, which may not be an option in some real-time or near-real-time applications, like Voice over Internet Protocol (VoIP), multiplayer online gaming applications and the like. More information concerning UDP may be found in RFC 768, entitled "User Datagram Protocol,"

and dated 28 Aug. 1980, the entire contents of which are hereby incorporated by reference as if set out in this disclosure in their entirety.

Despite the differences between TCP and UDP, both TCP and UDP provide measures for removing inactive packet flows based on often statically configured timeout values. In TCP, a user timeout may be defined on a per-packet flow basis that indicates how long transmitted data may remain unacknowledged before a TCP connection (or session) is forcefully closed. UDP likewise provides for a similar timeout value that controls how long a UDP flow will be maintained before being removed.

These timeout values are specified locally on each device and, for UDP, may be optional. The timeout values in both TCP and UDP are provided to facilitate resource usage within a given device and may vary based on a given devices capabilities. For example, assuming firewall 43 is a lightweight firewall capable of supporting fewer connections relative to a heavyweight firewall, the network administrator may configure the TCP timeout for firewall 43 to be a smaller time duration in comparison to the heavyweight firewall. Moreover, these timeout values may be configured based, not only on the capacity or capabilities of the network device, but also based on the expected or documented amount of traffic flows that will or have been processed. Assuming for purposes of illustration that a large numbers of packet flows are processed by firewall 43, the network administrator may configure the TCP timeout for firewall 43 to be of a smaller time duration than if a smaller relative number of packet flows are processed by firewall 43. The smaller duration in this scenario may enable the firewall 43 to free up resources (such as memory to store state associated with the TCP session and processor cycles to process the packets of this packet flow) more quickly and thereby facilitate processing of the relatively larger number of packet flows. Thus, these timeout values may fluctuate over time to accommodate varying circumstances and no set or defined way may be provided to guide network administrators in configuring these timeout values (although some recommendations are provided in terms of setting these timeout values, none of the recommendations are able to address each and every network situation and often the recommendations require capabilities that not all network devices may support (e.g., computing round trip times (RTTs)).

Network administrators are therefore left with little guidance in setting these timeout values and often fail to understand the total impact that these timeout values may have on overall network functionality. To illustrate, consider applications in which inactivity may occur, such as VoIP teleconferencing applications, virtual desktop applications, desktop sharing applications, P2P applications (e.g., P2P file sharing applications), and online gaming applications to provide a few examples. These applications may desire a longer timeout value so as to avoid sending keep-alive messages (which in TCP may represent TCP messages having a sequence number of one less than the last sequence number) to ensure that the session is not forcefully closed (or, in other words, timed out). Longer timeout values are, in some examples, preferred for mobile endpoint devices to avoid consuming power to send these keep alive messages (which may involve powering up the mobile device from a standby mode for the sole purpose of sending these keep alive messages). Setting relatively shorter timeout values in intermediate network devices 12 may therefore require endpoint devices 10 and destination devices 14 to frequently send keep alive messages for those applications prone to experiencing relatively longer durations of inactivity, which may impact the battery life of mobile endpoint devices and thereby significantly impact the user experience. Yet, setting these longer timeout values may result in more flows being dropped for some of intermediate network devices 12 that do not have high flow capacities, further impacting the user experience as dropped flows may result in delays in delivery of the data between endpoint devices 10 and destination devices 14.

In the end, selection of timeout values becomes a matter of balancing a number of factors with no clear way to definitively define the appropriate timeout value. To accommodate aging intermediate network devices and provide a longer working life-span, the network administrator may favor shorter timeout values so that these intermediate network devices 12 may process more flows despite any impact to the user experience at endpoint devices 10 due to the decreased battery life from sending frequent keep-alive messages. While various protocols, such as a port control protocol (PCP), may reduce the number of keep-alive messages that are required to be sent, these protocols often introduce additional network architecture (in the form of a dedicated PCP server for example) while also requiring full adoption of yet another protocol, i.e., PCP in this example, by all of the network devices throughout the entire network.

The techniques described in this disclosure may enable individual applications executing on endpoint devices 10 to, as noted above, control on a per-flow basis timeout values. A given application executing on endpoint device 10 may first determine, for a packet flow that will include data to be communicated by the application, a minimum timeout value indicative of a time duration during which endpoint device 10 is not required to send a keep-alive message to prevent an intermediate network device, such as one of intermediate network devices 12, positioned between endpoint device 10 and destination devices 14 from timing out the packet flow. The minimum timeout value (which may be denoted in this disclosure as "TOUT"), need not represent a field that compels a flow to timeout in the specified time, but is a minimum value specifying an amount of time that intermediated network devices 12 are to at least consider the flow entries to be active.

The application may, as described below in more detail, be configured to specify this minimum timeout value and register the value with an operating system on the endpoint device, whereupon the operating system may generate TCP or UDP packets for packet flows associated with the application to include this minimum timeout value. Including this minimum timeout value in the TCP or UDP packet (or any other L4 transport protocol packet) may effectively act as a request to the intermediate network device 12 that the packet flow be assigned the minimum timeout value. Assuming the packet is a TCP packet, the packet may represent a SYN packet that includes a TOUT option field specifying the minimum timeout value in a header of the SYN packet. Endpoint device 10 may then transmit the packet to destination device 14 executing a second instance of the same application.

One or more of intermediate network devices 12 may receive the SYN packet. Assuming for purposes of illustration that firewall 43 receives the SYN packet, firewall 43 may determine the minimum timeout value from the TOUT option field included in the header of the SYN packet. As described above, a network administrator or other network operator may configure firewall 43 to have a user timeout value for each particular flow (often differentiated by destination port number) representative of a maximum timeout value for which no acknowledgement (or ACK packet) need to be received. Firewall 43 may determine an intermediate timeout value (which may be denoted as "I_TOUT" throughout this disclosure) for the packet flow based on a comparison of the minimum timeout value to a maximum timeout value. When the minimum timeout value is less than the maximum timeout value, firewall 43 may specify the intermediate timeout value as equal to the minimum timeout value for the associated packet flow. When the minimum timeout value is greater than the maximum timeout value, firewall 43 may specify the intermediate timeout value as equal to the maximum timeout value for the associated packet flow. Firewall 43 may also forward this SYN packet to destination device 14.

Destination device 14, in response to this SYN packet, may generate an ACK packet as described above, transmitting this ACK packet back to endpoint device 10. Firewall 43 may receive this ACK packet and specify the intermediate timeout value in the ACK packet, forwarding the updated ACK packet that includes this intermediate timeout value to endpoint device 10. Endpoint device 10 may receive the ACK packet and determine the intermediate timeout value, comparing this intermediate timeout value to the minimum timeout value. When the minimum timeout value is the same as the intermediate timeout value, endpoint device 10 may determine that firewall 43 has configured the packet flow to be maintained in accordance with the minimum timeout value. Endpoint device 10 may then configure the packet flow keep-alive message transmittal in accordance with the minimum timeout value. Moreover, endpoint device 10 may generate and transmit a SYNACK packet to destination device 14. In some instances, endpoint device 10 generates the SYNACK packet to include the intermediate timeout value so as to confirm with destination device 14 that the minimum timeout value (given that the intermediate timeout value is equal to the minimum timeout value) has been agreed upon with firewall 43. In other instances, endpoint device 10 generates the SYNACK packet without the intermediate timeout value, which destination device 14 may be configured to determine as implicit agreement with the minimum timeout value.

When the minimum timeout value is not the same as the intermediate timeout value, endpoint device 10 may determine that firewall 43 has configured the packet flow to be maintained in accordance with the maximum timeout value. More specifically, the application that originated the original minimum timeout value may then configure the packet flow keep-alive message transmittal in accordance with the maximum timeout value. Moreover, the application may generate and transmit a SYNACK packet to destination device 14. The application generates the SYNACK packet to include the intermediate timeout value so as to apprise the destination device 14 that the maximum timeout value at firewall 43, not the minimum timeout value, is to be used to maintain the packet flow.

In some instances, when the minimum timeout value is not the same as the intermediate timeout value, the application may be configured to drop the current TCP session and initiate a UDP connection, as different timeout values may be configured for different protocols. In these instances, the application transmits a UDP message without any handshake and embeds the minimum timeout value in the payload of the UDP message rather than in the UDP header given that the UDP header is currently not extensible (or, in other words, does not provide for option fields like TCP). The same procedure generally takes place with respect to UDP messages, where firewall 43 may perform the same comparison and inform endpoint device 10 of the maximum timeout value by way of the intermediate timeout value being set to the maximum timeout value when the maximum timeout value is less than the minimum timeout value. The application may elect to use UDP and configure the maximum timeout value for the packet flow or may elect to use TCP depending on which maximum timeout value is longer (and therefore closer to the minimum timeout value in these circumstances). When the UDP maximum timeout value is greater than the minimum timeout value, the application may configure the packet flow in accordance with the minimum timeout value.

In this respect, a strategy and protocol is proposed in this disclosure to achieve keep-alive reduction in what may be considered a light weight manner with potentially reduced or minimum burden on stateful intermediate devices 12 for compliance with application-specific timeout values. The techniques may provide the following advantages:

1. With the new protocol there is no need for complex algorithm in the stateful device, e.g., firewall 43, to act as a server.
2. There may be no need for the client to provide a special client to achieve the reduction in keep-alive.
3. The reduction in keep-alive messages may be achieved globally across all the devices along the path taken by Packet/Flow in the network.
4. The time out variations may be handled on a per flow basis, where every different flow from a subscriber may ask for different flow time out values based on what the application considers appropriate timeout values.
5. There may not be an increased waste of router resources, because the techniques may not involve a separate control channel to function.

Figure 2:
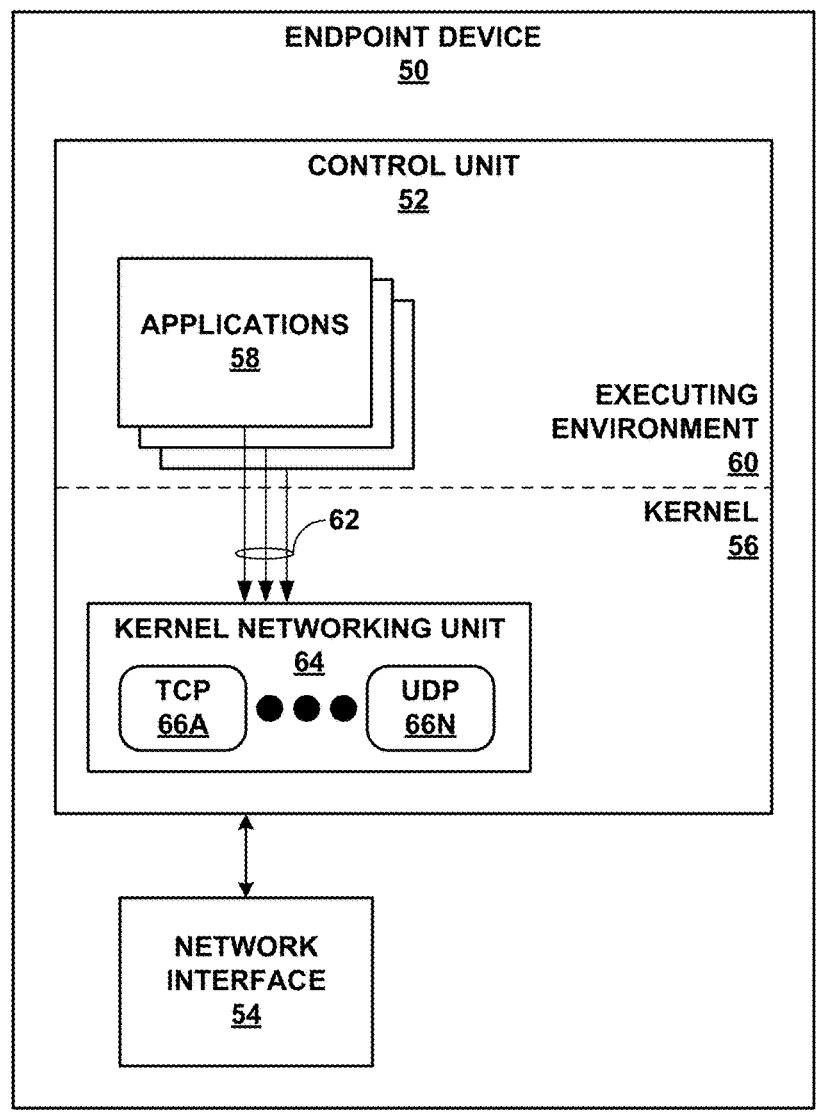
FIG. 2 is a block diagram illustrating an example of an endpoint device configured to perform the techniques described in this disclosure.

FIG. 2 is a block diagram illustrating an example of an endpoint device configured to perform the techniques described in this disclosure. Endpoint device 50 may correspond to one of endpoint devices 10 shown in the example of FIG. 1. Any or all of endpoint devices 10 may include components similar to those of endpoint device 50. In the example of FIG. 2, endpoint device 50 includes control unit 52, network interface 54, and user interface 56. Network interface 54 may comprise one or more elements for communicating via a computer-based network, such as a network interface card (NIC) that provides Ethernet access, a wireless network interface card conforming to one or more wireless networking protocols, e.g., IEEE 802.11 protocols, or the like.

Control unit 52 may represent hardware or a combination of hardware with software and/or firmware. Thus, when including software or firmware, it should be understood that requisite hardware may be included in control unit 52, such as one or more processing units and one or more computer-readable storage media that store instructions corresponding to the software or firmware. The processing units may include any processing circuitry, such as one or more microprocessors, digital signal processors (DSPs), application-specific integrated circuits (ASICs), field programmable gate arrays (FPGAs), or the like.

Control unit 52 is configured to execute an operating system, the core of which is shown as kernel 56. Kernel 56 represents a computer program configured to manage input/output requests from applications 58 and translates these requests into data processing instructions for the underlying processor and other electronic components of endpoint device 50, such as network interface 54. Kernel 56 generally provides execution environment 60 to support execution of applications 58. Applications 58 comprise executable software instructions that may be stored in a computer-readable storage medium of control unit 52 and executed by a processing unit of control unit 52. Applications 58 may represent instances of a variety of applications for endpoint device 50, such as email applications, web browsers, calendars, games, music players, texting applications, telephone applications (which may use voice over IP (VOIP)), video chat applications, P2P applications, desktop sharing applications, virtual desktop applications or the like.

One or more of applications 58 may issue kernel calls 62 to kernel networking unit 64 of kernel 62. Kernel networking unit 64 may represent a unit configured to translate these kernel calls 62 into data processing instructions for generating, transmitting and receiving one or more packets in accordance with one or more of transport protocols 66A-66N ("transport protocols 66"). Kernel network unit 64 may interface with network interface 54 to transmit and receive these packets via a network, such as access networks 25. As shown in the example of FIG. 2, examples of transport protocols 66 include TCP 66A and UDP 66N. These kernel calls 62 may include requests to establish a TCP session or UDP flow with a particular destination device, e.g., one of destination devices 14 shown in the example of FIG. 1. Kernel network unit 64 may invoke the corresponding one of transport layer protocols 66 to establish the session or flow. For example, kernel networking unit 64 may invoke TCP 66A to generate the SYN packet, the ACK packet and the SYNACK packet described above. Kernel network may, as another example, invoke UDP 66N to generate the above noted UDP packets.

For example, one or more of these kernel calls 62 may include a request to establish, using TCP as an example, a TCP session, where these one or more kernel calls 62 may include an application-specific minimum timeout value. Kernel network unit 64 may then, in response to this call 62, invoke TCP 66A to generate a TCP SYN packet having a header that includes the specified minimum timeout value, interfacing with network interface 54 to transmit the generated TCP SYN packet to the one of destination devices 14 specified in the kernel call 62. As another example, applications 58 may separately register with kernel network unit 64 a respective minimum timeout value to be applied to subsequent communication sessions requested and established by the applications.

Assuming that client device 50 may also generally represent one of destination devices 14 shown in the example of FIG. 1 and further assuming that this one of destination devices 14 was specified in the before mentioned kernel call 62 as the device with which to establish the TCP session, client device 50 may subsequently receive the SYN packet with the minimum timeout value. In response to receiving this SYN packet, kernel network unit 64 may invoke TCP 66A to generate an ACK packet, acknowledging the SYN packet. TCP 66A may interface with network interface 54 to transmit this ACK packet back to the sending client device 50.

Assuming, for purposes of illustration, that endpoint device 50 once again represents one of endpoint devices 10, endpoint device 50 receives the ACK packet, which has been, as noted above, modified by one of intermediate devices 12, to include an intermediate timeout value. Kernel network unit 64 may, in response to receiving this ACK packet, invoke TCP 66A to process the ACK packet. TCP 66A may parse the intermediate timeout value from the ACK packet, comparing this intermediate timeout value to the minimum timeout value. When the intermediate timeout value is equal to the minimum timeout value, TCP 66A may update a session table to indicate that keep-alive messages for the session should be sent in accordance with the minimum timeout value. As noted above, when the intermediate time out value is equal to the minimum timeout value, TCP 66A may generate a TCP SYNACK packet that may, in some instances, include the intermediate timeout value, while in other instances, the TCP SYNACK packet may not include the intermediate timeout value. When the intermediate time out value is not equal to the minimum timeout value, TCP 66A may update a session table to indicate that keep-alive messages for the session should be sent in accordance with the intermediate timeout value. As noted above, when the intermediate time out value is not equal to the minimum timeout value, TCP 66A may generate a TCP SYNACK packet to include the intermediate timeout value so as to update the one of destination devices 14. TCP 66A may interface with the network interface 54 to send the TCP SYNACK packet to the one of the destination devices 14.

Assuming again for purposes of illustration that endpoint device 50 represents the one of destination devices 14, endpoint device 50 may receive the TCP SYNACK packet with kernel network unit 64 invoking TCP 66A to determine whether the TCP SYNACK packet includes the intermediate timeout value. When the TCP SYNACK packet includes the intermediate timeout value, TCP 66A determines whether the intermediate timeout value is equal to the minimum timeout value previously set in the session table for the corresponding session. When the intermediate timeout value is the same as the minimum timeout value, TCP 66A leaves the minimum timeout value in place for the session. When the intermediate timeout value is not the same as the minimum timeout value, TCP 66A sets the intermediate timeout value for the TCP session.

In this manner, both endpoint device 10 and destination device 14, as represented by endpoint device 50, may determine a timeout value for the TCP session, UDP flow or any other layer four packet flow via minimum timeout values embedded in a packet of the same packet flow that will carry data associated with the instance of the applications 58. In some instances, this minimum timeout value will be replace with an intermediate timeout value when the intermediate timeout value is less than the minimum timeout value, thereby potentially ensuring that endpoint device 10 and destination device 14 transmit keep-alive messages during times of application inactivity to maintain the packet flow state at the intermediate network device. Moreover, when the minimum timeout value is less than the intermediate timeout value, the intermediate network device may more efficiently manage the state for the flow during times of increased traffic. That is, while the minimum timeout value does not necessarily indicate a time duration at which point the flow may be timed out, the intermediate network device may configure the maximum timeout value for the flow during times of less relative traffic and then, during times of increased traffic, configure the minimum timeout value to preserve resources, as the minimum timeout value may result in time outs occurring before the maximum timeout value.

Destination device 14 may, in this respect, be configured to perform the example methods set forth in the following clauses:

Clause 1. A method comprising determining, from a packet of a packet flow that will include data from a first instance of an application executed by a first computing device, a minimum timeout value indicative of a time duration during which the first computing device is not required to send a keep-alive message to prevent an intermediate network device positioned between the first computing device and a second computing device from timing out the packet flow, configuring the minimum timeout value for the packet flow, and maintaining the packet flow in accordance with the minimum timeout value.

Clause 2. The method of clause 1, wherein the first packet comprises a transport control protocol (TCP) packet including a header having an option field specifying the minimum timeout value, and wherein determining the minimum timeout value comprises determining the minimum timeout value from the optional field in the header of the TCP packet.

Clause 3. The method of clause 1, wherein the first packet comprises a user datagram protocol (UDP) packet including a field in a payload of the UDP packet specifying the minimum timeout value, and wherein determining the minimum timeout value comprises determining the minimum timeout value from the field in the payload of the UDP packet.

Clause 4. The method of clause 1, further comprising receiving a subsequent packet forwarded by the intermediate network device specifying an intermediate timeout value having a value less than the minimum timeout value, configuring the intermediate timeout value for the packet flow in place of the minimum timeout value, and maintaining the packet flow in accordance with the intermediate timeout value rather than the minimum timeout value.

Figure 3:
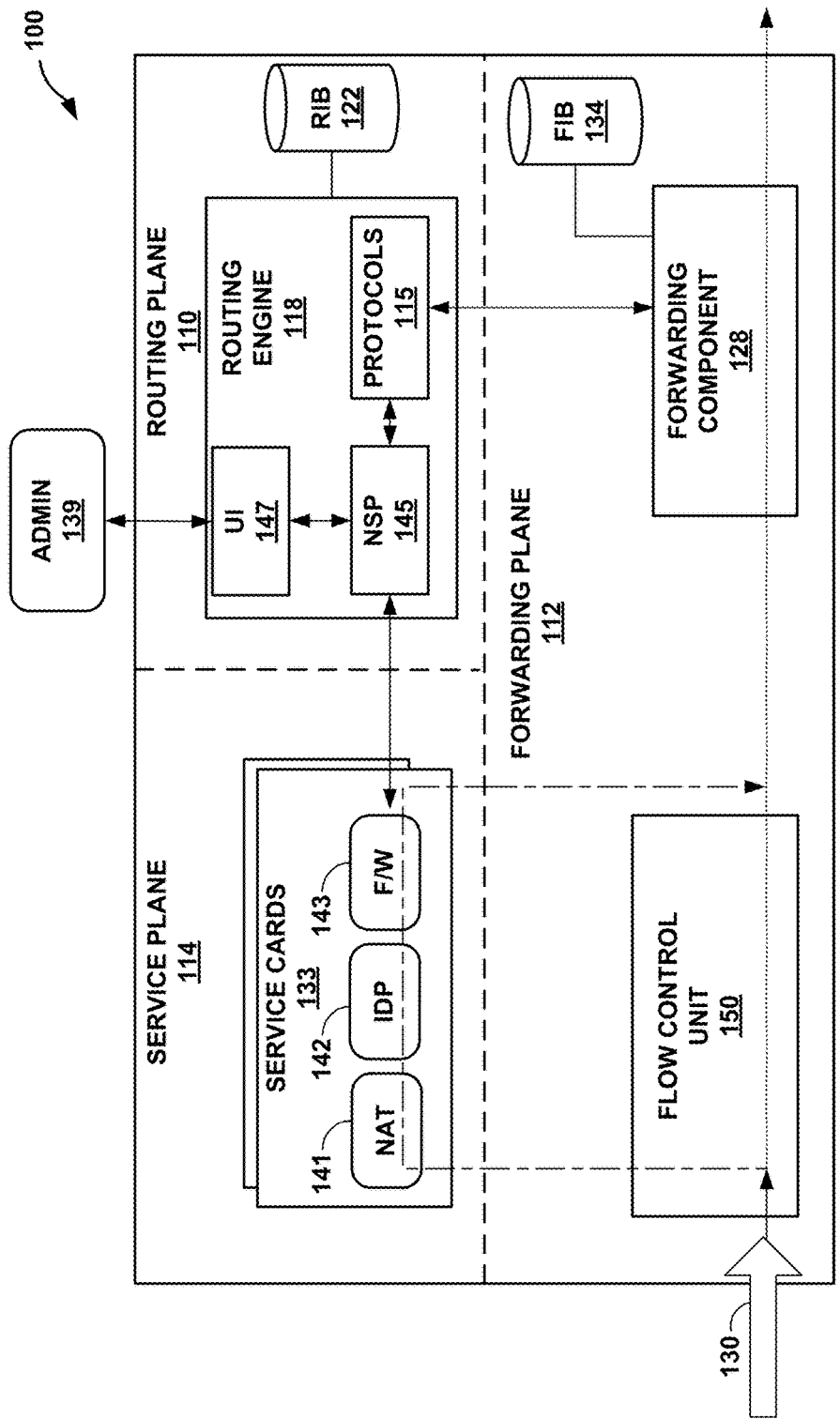
FIG. 3 is a block diagram illustrating an example intermediate network device configured to perform the minimum timeout techniques described in this disclosure.

FIG. 3 is a block diagram illustrating an example intermediate network device 100 configured to perform the minimum timeout techniques described in this disclosure. In this example, network device 100 may be a standalone device, a router or a gateway device. Network device 100 may perform the functions described above with respect to one or more of NAT device 41, IDP device 42 and firewall 43 shown in the example of FIG. 1. As such example, network device 100 may, for example, be a high-end router or gateway capable of deployment within a service provider network.

In the example of FIG. 3, the components of network device 100 may be logically organized into a routing plane 110, a forwarding plane 112 and a service plane 114. Routing plane 110 includes a routing engine 118 configured, among other things, to maintain a routing information base (RIB) 122 to reflect the current topology of a network and other network entities to which network device 100 is connected. For example, routing engine 118 provides an operating environment for execution of routing protocols 115 that communicate with peer routers and periodically update RIB 122 to accurately reflect the topology of the network and the other network entities. Example protocols include routing and label switching protocols, such as BGP, ISIS, RSVP-TE and LDP. In some examples, network device 100 may be a mobile gateway having a distributed control plane for handling mobile subscribers, such as described within U.S. Pat. No. 8,650,279, entitled "MOBILE GATEWAY HAVING DECENTRALIZED CONTROL PLANE FOR ANCHORING SUBSCRIBER SESSIONS," which is hereby incorporated herein by reference. In this case, as a mobile gateway, intermediate network device 100 may have a plurality of session management cards, each handling control functions for a plurality of the subscriber sessions. Each of the session management cards may perform the deterministic NAT techniques described herein for the subscriber sessions assigned to the session management card, and/or functions of other services, such as IPSec, for which state information is checkpointed for high availability.

Forwarding plane 112 receives and forwards packets associated with network packet flows 130. Forwarding component 128 maintains forwarding information base (FIB) 134 in accordance with RIB 122, which associates network destinations or MPLS labels with specific next hops and corresponding interface ports of output interface cards of network device 100. Routing engine 118 typically processes RIB 122 to perform route selection and generate FIB 134 based on selected routes. In this way, next hop information may be programmed into forwarding plane 112. Routing engine 118 may generate FIB 134 in the form of a radix tree having leaf nodes that represent destinations within the network. U.S. Pat. No. 7,184,437, the contents of which are incorporated herein by reference in its entirety, provides details on an example of a router that utilizes a radix tree for route resolution.

When forwarding a packet, forwarding component 128 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 112 may be provided by dedicated forwarding integrated circuits normally associated with high-end routing and forwarding components of a network router. U.S. Pat. No. 8,050,559, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

In this way, network device 100 integrates service plane 114 and routing plane 110 to utilize shared forwarding plane 112. Forwarding plane 112 may be a rich and dynamic shared forwarding plane, optionally distributed over a multi-chassis router. Moreover, forwarding plane 112 may be provided by dedicated forwarding integrated circuits normally associated with high-end routing components of a network router. Consequently, routing plane 110 and forwarding plane 112 may operate as a high-end router or gateway, and service plane 114 has been tightly integrated within network device 100 (e.g., by way of service cards 133) so as to use forwarding plane 112 of the routing components in a shared, cooperative manner. Further details of one example of network device 100 can be found in U.S. Pat. No. 8,339,959, filed Jul. 30, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Network services process (NSP) 145 of routing engine 118 communicates with and programs service cards 133 of service plane 114. In response, NSP 145 programs services cards 133 with corresponding configuration data, causing the service cards of service plane 114 to perform the functions described herein when processing packets redirected from forwarding plane 112. One or more of service cards 133 may, for example, execute a NAT controller 141 that operates on packets for new subscriber communication flows to dynamically determine a public network address and port range, an IDP controller 142 configured to perform intrusion detection and prevention services, and a firewall controller 143 configured to perform firewall services.

Forwarding plane 112 includes flow control unit 150 to selectively direct packets of newly detected communication sessions to service plane 114 for processing. For example, flow control unit 150 receives incoming packet flows 130 (e.g., outbound subscriber traffic) and determines whether to send the packets through the service plane 114 for processing within one or more of service cards 133, or whether to bypass the service plane 114. Service cards 133 receive packets from flow control unit 150, process the packets in accordance with one or more of NAT controller 141, IDP controller 142 and firewall controller 143, and relay the packet or any response packets to forwarding plane 112 for forwarding by forwarding component 128 in accordance with FIB 134.

As noted above, a network operator, such as admin 139, may interface with routing engine 118 via user interface 147 ("UI 147") to specify a maximum timeout value for each of TCP, UDP and any other layer four transport protocol. UI 147 may forward the configuration data, including the protocol-specific maximum timeout values, to NSP 145, which may then interface with service cards 133 to configure one or more of NAT 141, IDP 142 and firewall 143 with the protocol-specific maximum timeout values. In some instances, admin 139 may configure different maximum timeout values for the same transport protocol in different ones of NAT 141, IDP 142 and firewall 143. For example, admin 139 may configure a first maximum timeout value for TCP in NAT 141 and a second, different maximum timeout value for TCP in IDP 142. In this way, admin 139 may configure maximum timeout values in NAT 141, IDP 142 and firewall 143. In some instances, these maximum timeout values may not be explicitly configured by admin 139, but may be defined as a default value for one or more of NAT 141, IDP 142 and firewall 143.

In accordance with the techniques described in this disclosure for controlling packet flow timeouts, flow control unit 150 may receive a packet for a packet flow 130 and forward the packet to service cards 133. This packet may, for example, represent the TCP SYN packet that includes a minimum timeout value in a header of the TCP SYN packet. Assuming service cards 133 are configured to apply firewall services to this TCP SYN packet, service cards 133 may invoke firewall controller 143 to apply the firewall services to the TCP SYN packet. When initially processing these packets, firewall controller 143 may invoke a TCP unit (not shown for ease of illustration purposes) having been configured with the maximum timeout value in the manner noted above. The TCP unit of firewall controller 143 may determine the minimum timeout value from the header of the TCP SYN packet and compare this minimum timeout value to the maximum timeout value. When the minimum timeout value is less than the maximum timeout value, firewall controller 143 may configure the TCP session data associated with this packet to have a timeout value equal to or greater than the minimum timeout value. When the minimum timeout value is greater than the maximum timeout value, firewall controller 143 may configure the TCP session data associated with this packet to have a timeout value equal to the maximum timeout value. Firewall controller 143 may then perform the firewall services and forward this packet via forwarding components 128 to the intended destination of the packet.

Flow control unit 150 may subsequently receive a TCP ACK packet in response to the TCP SYN packet previously forwarded, forwarding this packet again to service cards 133. Service cards 133 may again invoke firewall controller 143, whereupon the TCP unit of firewall controller 143 may update the TCP ACK packet with the intermediate timeout value, which may represent the value specified in the TCP session data associated with the TCP ACK packet (which is the same as that associated with the TCP SYN packet given their packets associated with the same session). Firewall controller 143 may then perform the firewall services and forward this packet via forwarding components 128 to the intended destination of the packet.

Flow control unit 150 may then receive a TCP SYNACK packet in response to the TCP ACK packet previously forwarded, forwarding this packet to service cards 133. Service cards 133 may invoke firewall controller 143, whereupon the TCP unit of firewall controller 143 may, in some instances, determine a minimum timeout value from a header of the TCP SYNACK packet. The TCP unit of firewall controller 143 may, when the minimum timeout value is not present, leave in place the previously configured timeout value for the associate TCP session. When the minimum timeout value is present in the TCP SYNACK packet, the TCP unit may determine that the intermediate timeout value (equal to the maximum timeout value) has been agreed upon as the timeout value to use for the associated session. Firewall controller 143 may then perform the firewall services and forward this packet via forwarding components 128 to the intended destination of the packet.

The following pseudo-code illustrates example processing by a stateful, intermediate device:

```
/* Phase: Usual TCP header analysis phase in a stateful device */
if (SYN) {
   if(Option_Contains_TOUT( )) {
      new_time_out = Get_timeout_value_from_TOUT_in_TCP_Header( );
      if (new_time_out < Max_affordable_timeout)
         Flow> timeout = new_time_out;
      else
         Flow> timeout = default_time_out;
   } else {
      Flow> timeout = default_time_out;
   }
}
if (ACK) {
   /* Inform endpoint device of timeout */
   if (Flow> timeout != new_time_out) update_ACK(Flow> timeout)
}
```

In the foregoing pseudo-code, when the packet is a TCP SYN packet, the intermediate network device 100 first determines whether the packet includes the TOUT option in the header of the TCP SYN packet. When the packet includes the TOUT option, intermediate network device 100 determines the minimum timeout value (denoted as "new_time_out") and compares this new timeout value to the maximum timeout value (denoted as "Max_affordable_timeout"). When the minimum timeout value is less than the maximum timeout value, intermediate network device 100 configures the associated flow timeout as equal to the minimum timeout value. When the minimum timeout value is greater than or equal to the maximum timeout value, intermediate network device 100 configures the associated flow timeout as equal to the default timeout value (which may refer to the maximum timeout value). When the TOUT option is not specified, the intermediate network device 100 may configure the timeout value for the flow to be the default timeout value.

When the packet is a TCP ACK packet, the intermediate network device 100 may determine whether the currently configured flow timeout value is not equal to the minimum timeout value. When the configured flow timeout value is not equal to the minimum timeout value (meaning that the minimum timeout value is greater than the maximum timeout value), intermediate network device 100 updates the ACK packet to include the configured timeout value for this flow (so as to inform endpoint device 10 that the timeout value is not capable of being set to the minimum timeout value).

In this way, the techniques may reduce the complexity problem and the Internet-wide awareness problem with regard to timeout values. The techniques may facilitate the propagation of the flow-timeout (TOUT) across the Internet without potentially requiring any complex implementations.

Based on the above examples, the techniques may potentially promote the following advantages:

(1) The keep-alive reduction may be enforced across the Internet without possibly requiring a relatively more complex algorithm and wastage of router resource for inter-communication within the connected devices;

(2) None of the intermediate stateful devices may be required to act as a server, nor potentially implement a new complex protocol (for example, PCP);

(3) For every subscriber, individual applications may choose their timeout values without potentially consulting a PCP client;

(4) Router resources may not be wasted for new communications within the PCP controlled devices to possibly achieve the reduction in keep-alive messages; and (5) Every new flow from the same subscriber may have individual flow timeout values in the middle-box/stateful device based on individual application recommendation of the TOUT per flow.

The techniques may in this way provide for reduction in keep-alive and potentially promote zero battery/zero [ACK] usage in endpoint devices for the TOUT duration, with proper communicated information about client device expectation. The result of these techniques may promote battery savings in mobile devices given that the mobile device may be silent for the TOUT duration without possibly requiring an admonitory transmission of a keep-alive to the middlebox/stateful device. Additionally, because the TCP TOUT option field is an optional field, those intermediate network devices 100 that are not configured to operate on this option field may ignore the field with no detrimental effect. That is, for any intermediate device (e.g., L4 device) that inspects the TCP SYN, and which does not know abot 4 byte TOUT, it is yet another unknown field.

In some instances, the ACK packet received by the TCP unit of the firewall controller 143 may already have an intermediate timeout value specified in the header of the ACK packet. These instances usually occur when two or more intermediate network devices or, in the case of intermediate network devices 100, when two or more intermediate network services are applied by service plane 114. That is, flow control unit 150 may forward the ACK packet to service cards 133, where service cards 133 determine that two or more of NAT 141, IDP 142 and firewall 143 are to be invoked to process the ACK packet. Assuming that IDP controller 142 is invoked prior to invocation of firewall controller 143 for purposes of illustration, IDP controller 142 may update the ACK packet in a manner similar to that described above with respect to firewall controller 143. IDP controller 142 may, after updating the ACK packet to include an IDP-specific intermediate timeout value, redirect the ACK packet to the firewall controller 143 (either directly or indirectly via flow control unit 150).

In these instances, the TCP unit of firewall controller 143 may, rather than simply update the ACK packet, first determine whether the ACK packet includes an intermediate timeout value. When the ACK packet includes an intermediate timeout value, the TCP unit may compare the IDP-specific intermediate timeout value with the firewall-specific intermediate timeout value. When the IDP-specific intermediate timeout value is greater than the firewall-specific intermediate timeout value, the TCP unit of firewall controller 143 may replace the IDP-specific intermediate timeout value with the firewall-specific intermediate timeout value in the ACK packet. The subsequent TCP SYNACK packet will, in some instances, include the firewall-specific intermediate timeout value to inform both IDP controller 142 and destination device 14 of the agreed upon firewall-specific intermediate timeout value to use for this flow/session. When the IDP-specific intermediate timeout value is less than the firewall-specific intermediate timeout value, the TCP unit of firewall controller 143 may leave the IDP-specific intermediate timeout value in place. In this way, multiple intermediate network devices (or services in the context of the example of FIG. 3) may agree on flow control timeout values for specific flows on a flow-by-flow basis.

Figure 4C:
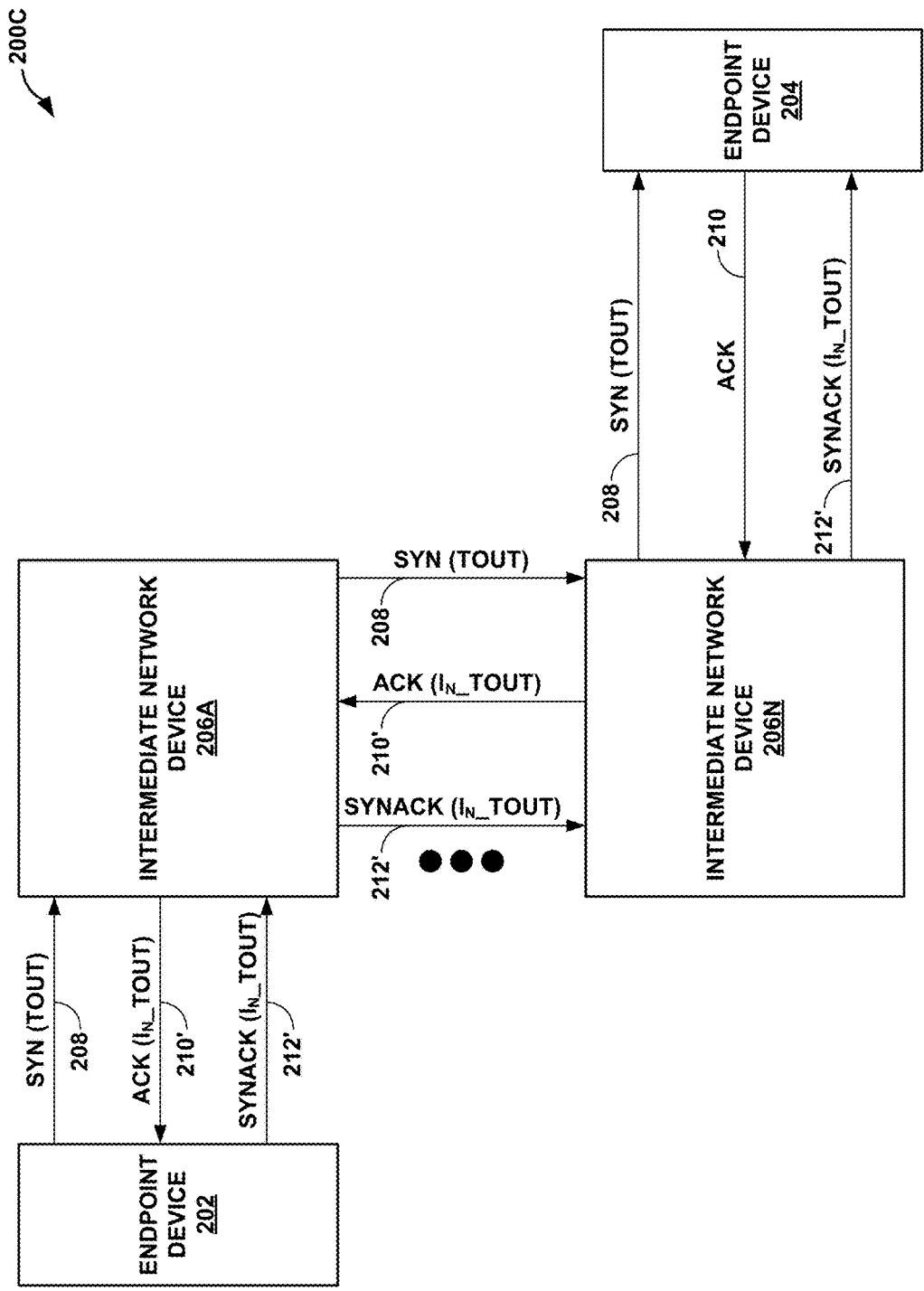

FIGS. 4A-4C are block diagrams illustrating exemplary systems 200A-200C that may be configured to perform various aspects of the flow control timeout control techniques described in this disclosure. Systems 200A-200C may represent abstracted versions of system 10 shown in the example of FIG. 1. In systems 200A and 200B, endpoint devices 202 and 204 may represent one of endpoint devices 10 and one of destination devices 14, while intermediate device 206 may represent one of intermediate network devices 12, e.g., firewall 43. System 200C differs slightly from systems 200A and 200B in that system 200C includes multiple intermediate network devices 206A-206N, which may represent two or more of intermediate network devices 12.

Referring first to the example of FIG. 4A, endpoint device 202 may initially send a SYN packet 208 that includes the TOUT value in a header of the SYN packet. Intermediate network device 206 may output SYN packet 208 to endpoint device 204, which responds with ACK packet 210. Intermediate network device 206 may process SYN Packet 208 in the manner described above and update ACK packet 210 to include the intermediate timeout value (denoted as "I_TOUT" in the example of FIG. 4A) in an option field of a header of the ACK packet. Intermediate network device 206 may output updated ACK packet 210' to endpoint device 202. In the example of FIG. 4A, it is assumed that the intermediate timeout value (I_TOUT) equals the minimum timeout value (TOUT) and that endpoint device 202 is configured to, when I_TOUT equals TOUT, output a SYN-ACK packet 212 that does not include the I_TOUT value. In these instances, the lack of any I_TOUT value in the SYNACK packet 212 implies to endpoint device 204 that the TOUT value was agreed upon as the timeout value for the associated flow/session.

Referring next to the example of FIG. 4B, endpoint devices 202 and 204 and intermediate network device 206 operate in a manner substantially similar to that described above with respect to the example of FIG. 4B except that endpoint device 202 includes the I_TOUT value in an option field located in a header of SYNACK packet 212 (where this updated SYNACK packet 212 is denoted as "updated SYN-ACK packet 212'"). As described above, endpoint device 202 may be configured to always include this I_TOUT value even when the I_TOUT value equals the TOUT value. In some instances also as described above, endpoint device 202 may only include the I_TOUT value in SYNACK packet 212' when the I_TOUT value does not equal the TOUT value.

Referring to the example of FIG. 4C, endpoint devices 202 and 204 operate in a manner substantially similar to that described above with respect to endpoint devices 202 and 204 shown in the example of FIG. 4B. As shown in the example of FIG. 4C, intermediate network device 206N updates ACK packet 210 to include an $N^{th}$ I_TOUT value (which is denoted as "$I_N$_TOUT"), thereby generating ACK Packet 210'. Intermediate network device 206A receives this ACK packet 210' having the $I_N$_TOUT and, as described above, compares this to the maximum timeout value configured for TCP within intermediate network device 206A. When this maximum timeout value is greater than $I_N$_TOUT, intermediate network device 206A leaves $I_N$_TOUT in place in the ACK packet 210' and forward this ACK packet 210' to endpoint device 202. Endpoint device 202 may then generate SYNACK packet 212', where this SYNACK packet 212' includes $I_N$_TOUT. Endpoint device 202 may transmit this SYNACK packet 212' with $I_N$_TOUT given that intermediate network device 206N and endpoint device 204 are not aware of any updates to the flow timeout performed by intermediate network devices 206A-206M and endpoint device 202. This SYNACK packet 212' may serve to inform intermediate network devices 206A-206N and endpoint device 204 of the agreed upon flow timeout.

FIGS. 5A-5E illustrate a flowchart of exemplary operation of endpoint devices and intermediate network devices in performing various aspects of the flow timeout control techniques described in this disclosure. For purposes of example, FIGS. 5A-5E are described with respect to FIG. 1.

Initially, an application executing on a sending endpoint device 10 shown in FIG. 1 may first determine an application-specific minimum timeout value (TOUT) (300). The application executed by the endpoint device 10 may be configured to communicate this minimum timeout value to network protocols of an operating system of the endpoint device 10, such as at the time of requesting establishment of a given communication session or by registering the minimum timeout value with the operating system for application to subsequent session. When a communication session is requested by the application, the operating system may generate a TCP or UDP packet to include this minimum timeout value. Including this minimum timeout value in the TCP or UDP packet (or any other L4 transport protocol packet) may effectively act as a request to the intermediate network device 12 that the packet flow be assigned the minimum timeout value. Assuming the packet is a TCP packet, the packet may represent a SYN packet that includes a TOUT option field specifying the minimum timeout value in a header of the SYN packet. In other words, endpoint device 10 may generate a SYN packet to include TOUT (302). Endpoint device 10 may then transmit the SYN packet to a receiving endpoint device, e.g., destination device 14, executing a second instance of the same application (304).

Figure 5A:
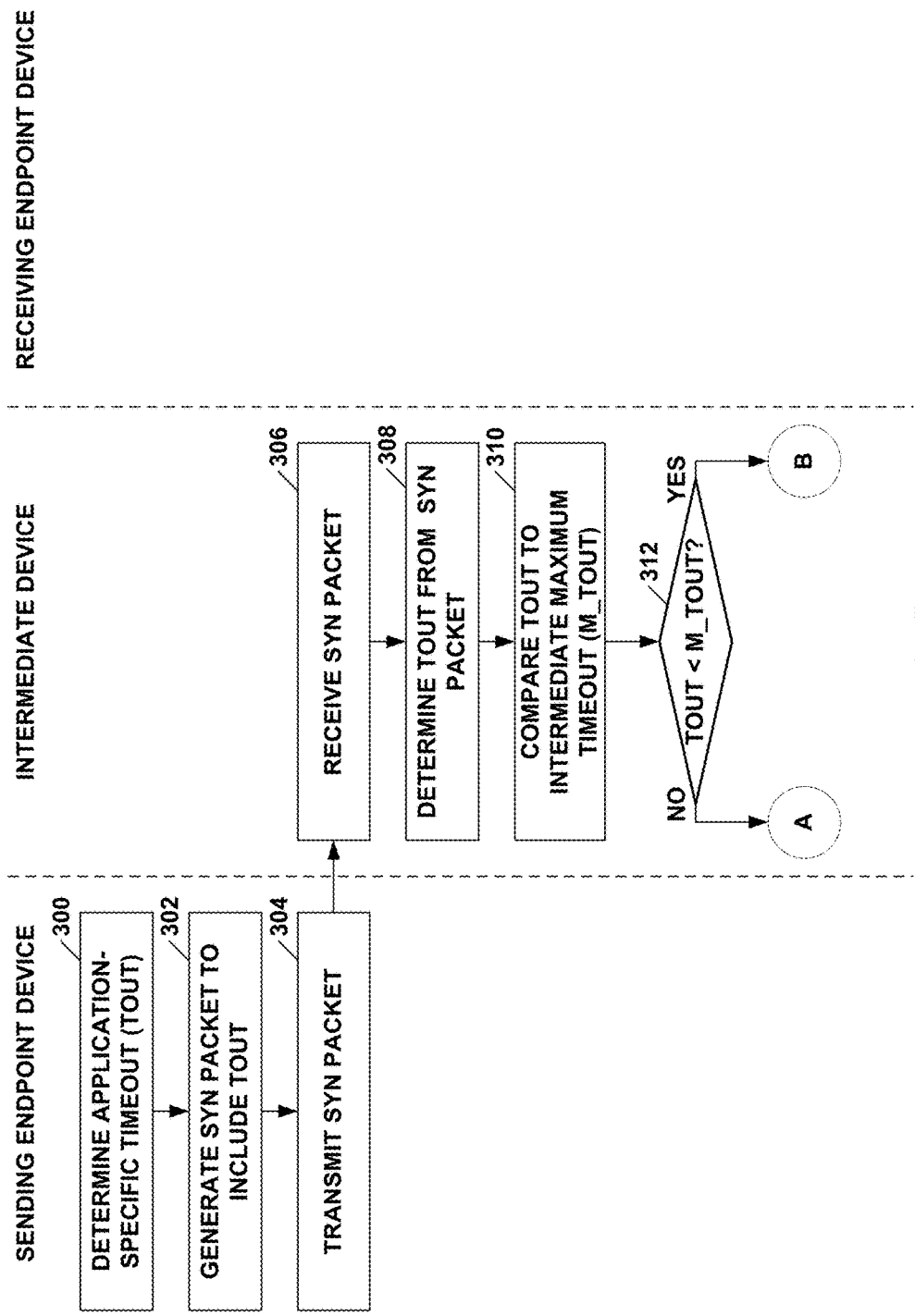
FIGS. 5A-5E are a flowchart illustrate exemplary operation of endpoint devices and intermediate network devices in performing various aspects of the flow timeout control techniques described in this disclosure.
Figure 5B:
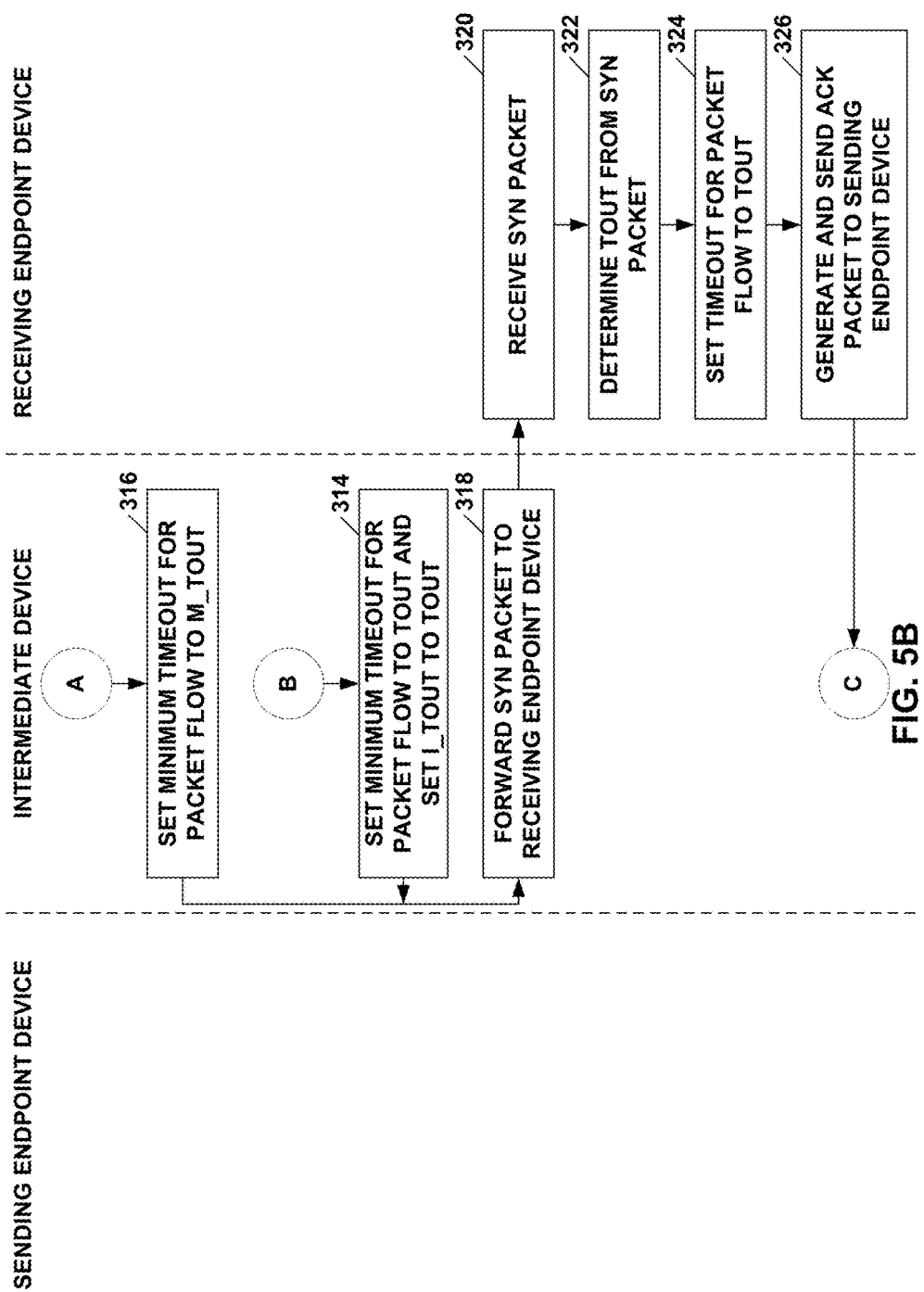

One or more of intermediate network devices 12 may receive the SYN packet (306). Assuming for purposes of illustration that firewall 43 receives the SYN packet, firewall 43 may determine the minimum timeout value from the TOUT option field included in the header of the SYN packet (308). Firewall 43 may determine a maximum timeout value (M_TOUT) and compare TOUT to M_TOUT (310). When the minimum timeout value is less than the maximum timeout value ("YES" 312), firewall 43 may set TOUT for the packet flow and set the intermediate timeout value as equal to the minimum timeout value for the associated packet flow (FIG. 5B: 314). When the minimum timeout value is greater than the maximum timeout value (FIG. 5A: "NO" 312), firewall 43 may specify the intermediate timeout value as equal to the maximum timeout value for the associated packet flow (FIG. 5B: 316). Firewall 43 forwards this SYN packet to destination device 14 (318).

Figure 5C:
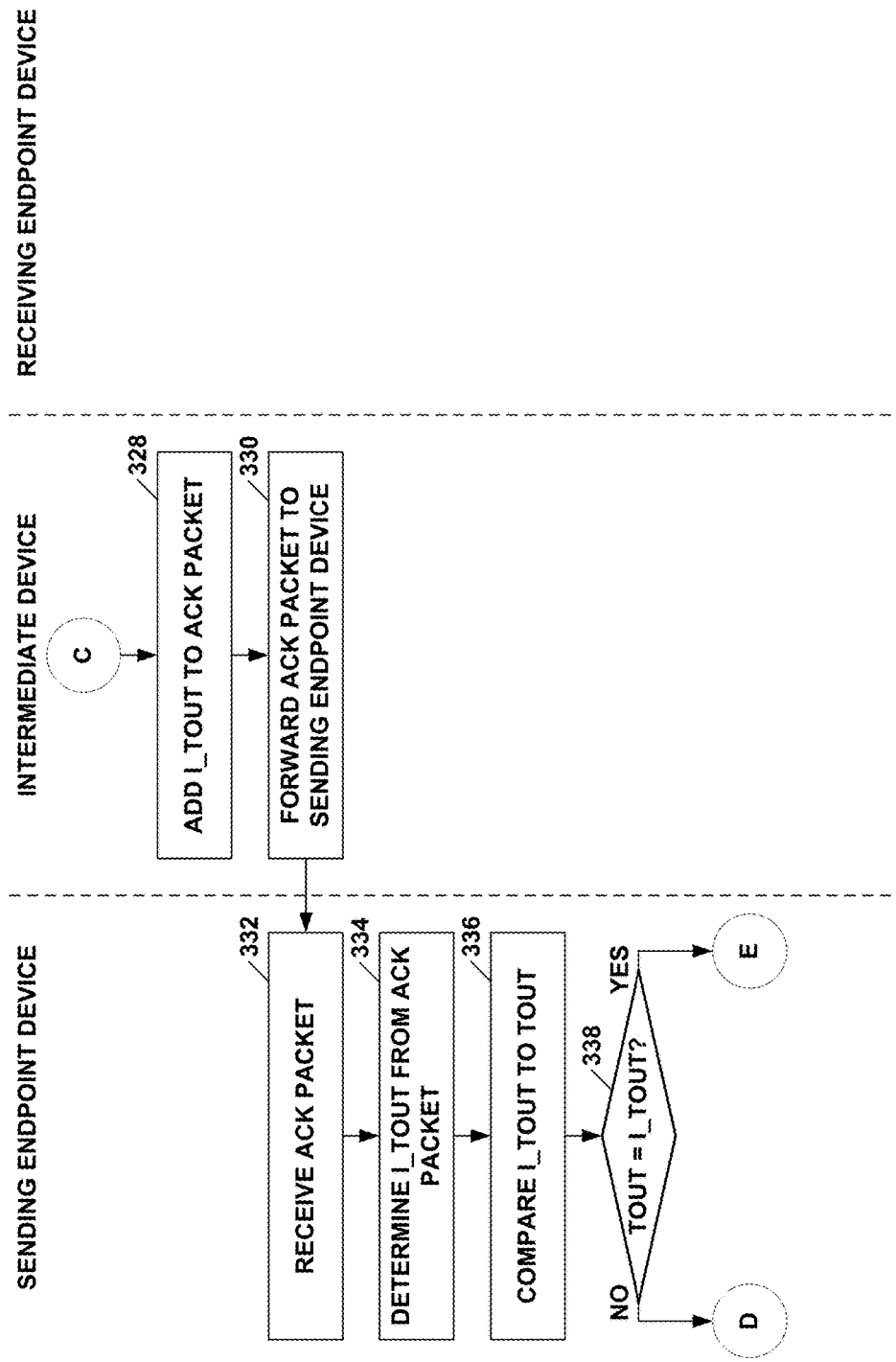
Figure 5D:
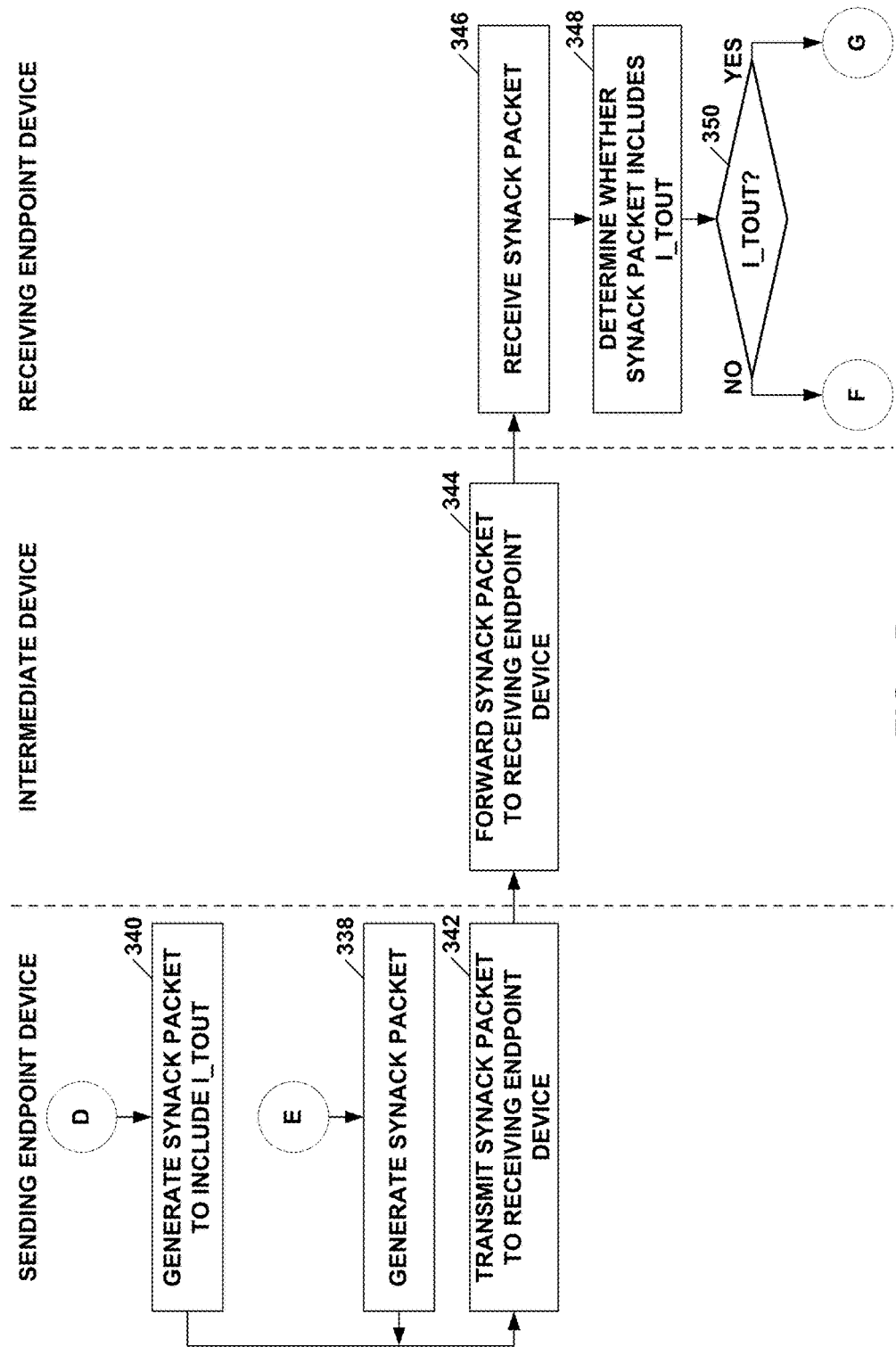

Destination device 14 receives the SYN packet (320) and determines TOUT from the SYN packet (322). Destination device 14 may then set the timeout for the packet flow to the minimum timeout value (TOUT) (324). Destination device 14, in response to this SYN packet, may then generate an ACK packet as described above, transmitting this ACK packet back to endpoint device 10 (326). Firewall 43 may receive this ACK packet and add the intermediate timeout value (I_TOUT) to the ACK packet, forwarding the updated ACK packet that includes this intermediate timeout value to endpoint device 10 (FIG. 5C: 328, 330). Endpoint device 10 may receive the ACK packet (332) and determine the intermediate timeout value from the ACK packet (334), comparing this intermediate timeout value to the minimum timeout value (336). When the minimum timeout value is the same as the intermediate timeout value ("YES" 336), endpoint device 10 may determine that firewall 43 has configured the packet flow to be maintained in accordance with the minimum timeout value. Endpoint device 10 may then configure the packet flow keep-alive message transmittal in accordance with the minimum timeout value. Moreover, endpoint device 10 may generate and transmit a SYNACK packet to destination device 14 (FIG. 5D: 338, 342). In some instances, endpoint device 10 generates the SYNACK packet to include the intermediate timeout value so as to confirm with destination device 14 that the minimum timeout value (given that the intermediate timeout value is equal to the minimum timeout value) has been agreed upon with firewall 43. In other instances, endpoint device 10 generates the SYNACK packet without the intermediate timeout value, which destination device 14 may be configured to determine as implicit agreement with the minimum timeout value. Firewall 43 may then transmit this SYNACP packet to destination device 14 (342).

When the minimum timeout value is not the same as the intermediate timeout value (FIG. 5C: "NO" 336), endpoint device 10 may determine that firewall 43 has configured the packet flow to be maintained in accordance with the maximum timeout value. Endpoint device 10 may then configure the packet flow keep-alive message transmittal in accordance with the maximum timeout value. Moreover, endpoint device 10 may generate and transmit a SYNACK packet to destination device 14 (FIG. 5D: 340, 342). Endpoint device 10 generates the SYNACK packet to include the intermediate timeout value to apprise the destination device 14 that the maximum timeout value at firewall 43, not the minimum timeout value, is to be used to maintain the packet flow.

Figure 5E:
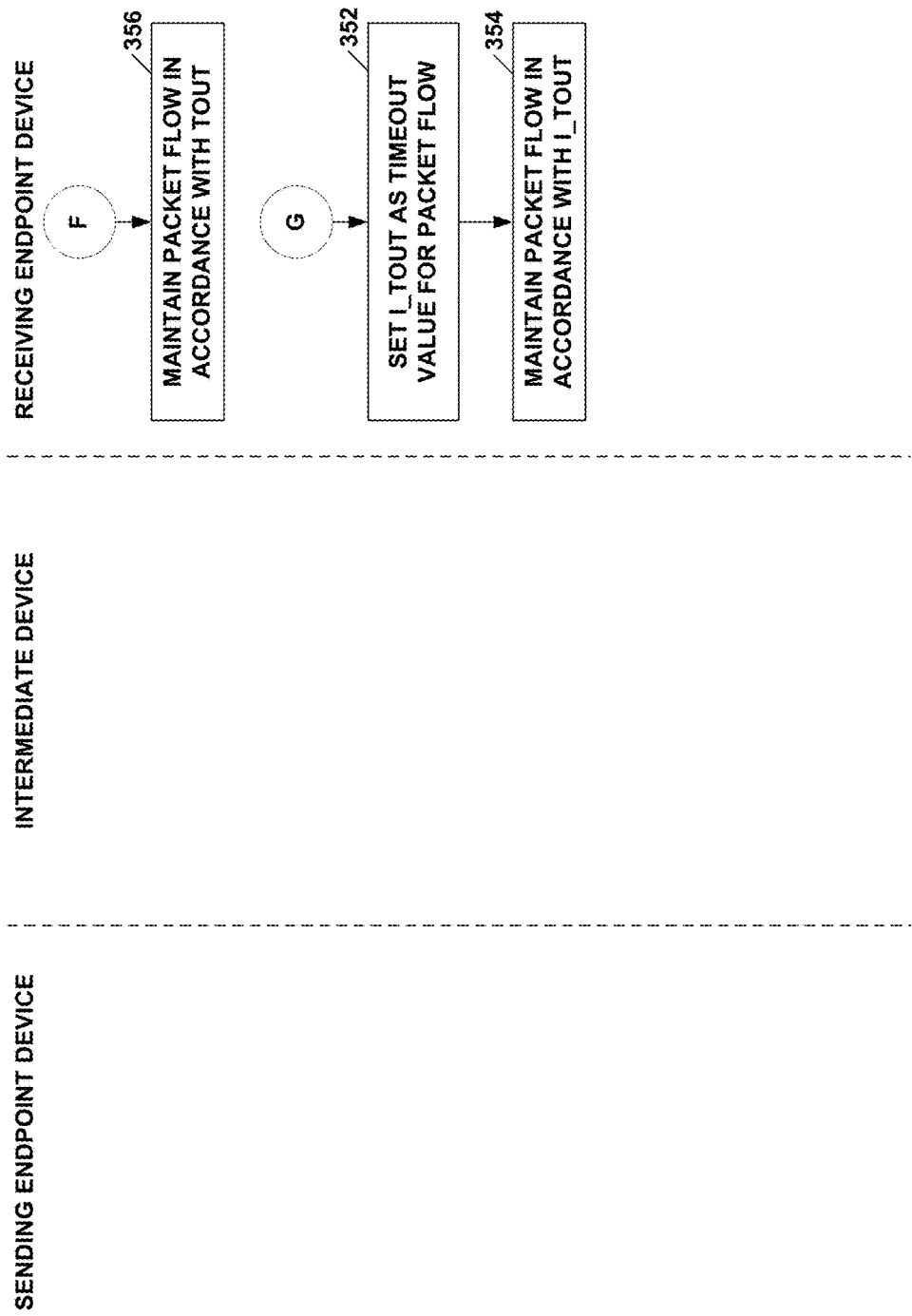

Firewall 43 receives the SYNACK packet and forwards the packet to destination device 14 (344), whereupon destination device 14 receives the SYNACK packet (346). Destination device 14 then proceeds to determine whether the SYNACK packet includes I_TOUT in an option field of the SYNACK packet header (348). When I_TOUT is included in the SYNACK packet ("YES" 350), destination device 14 sets I_TOUT as the timeout value for the corresponding packet flow and proceeds to maintain the packet flow in accordance with I_TOUT (FIG. 5E: 352, 354). When I_TOUT is not included in the SYNACK packet (FIG. 5D:

"NO" 350), destination device 14 maintains the packet flow in accordance with TOUT. Although described above with respect to TCP packets, the techniques may be performed with respect to UDP using payload fields instead of option header fields or any other layer four transport protocol.

FIGS. 6A and 6B are diagrams illustrating a TCP packet header 400 and a UDP packet 450 formed in accordance with various aspects of the flow timeout control techniques described in this disclosure. FIG. 6A is a diagram illustrating a TCP packet header 400 that includes a TOUT option field 402A for specifying the TOUT value and the I_TOUT values for various types of TCP packets, including ACK, SYN and SYNACK packets. The remaining option fields 402B-402N may specify other options unrelated to the aspects of the techniques described in this disclosure. Although shown as being the first option field, TOUT option field 402A may be specified in any order within the overall option fields 402. Moreover, although shown as being four bytes (32 bits) in length, the TOUT option field 402A may be of any size including one or more bits.

In this respect, the TCP header's 'option' field may be used to extend TCP. With the increasing complexity in introducing stateful devices all across the Internet and with the increasing complexity in the user end devices to maintain their flows/sessions in the Internet, the techniques described herein extend TCP. As such, at an intermediate device, awareness of the newly introduced field in the TCP options may eradicate the need for keep-alive and potentially ensure propagation of the client prescribed keep-alive across all stateful devices across the Internet.

'TOUT' (Client Prescribed Timeout option for a TCP flow), length: 4 byte. In this example, the definition of TOUT option may be stated as:

TOUT is the expected minimum lifetime of a flow, optionally prescribed by the application as an information to all the stateful devices across the Internet.

The conditional ifs:

The TOUT, does not in any way, nor could not be confused, as a field that compels a flow to timeout in the specified time. Rather TOUT may represent a minimum value at least till the flow entries should live in the stateful device In some instances, the MUST compliance of this option by any stateful device to understand this field in TCP Options may make sure that any stateful device can guarantee the reduction in keep-alive without potentially adhering to complex protocols. Adding to this, since the TOUT is situated in the header, the complying device need not worry about complexity in implementation.

FIG. 6B is a diagram illustrating a UDP packet 450 that includes a header portion 452 and a payload portion 454. Because UDP is not an extensible protocol that features fields similar to the option fields by which to extend UDP, UDP options may be specified in the first couple of bytes of payload portion 454. Accordingly, payload portion 454 may include TOUT field 456 for specifying the TOUT and the I_TOUT values. Although shown as being the first field, TOUT field 456 may be specified anywhere in payload portion 454 within the first number of bytes. Moreover, although shown as being four bytes (32 bits) in length, the TOUT field 456 may be of any size including one or more bits.

That is, for UDP based connections, if a UDP entry is dropped in an intermediate-box/stateful network device, the re-introduction of the flow may not have any issues, unless the ports are kept open in the user-devices. As such, for UDP, re-entry may be as smooth as introducing a new flow. However, there are certain P2P applications the intermediate network devices might expect the same treatment, e.g., expects the flow credentials intact for its lifetime. Even though we do not discuss in detail, the simple proposal would be the same as introducing a wedge in the start bits of the payload as the UDP header currently has no room for expansion. The start bits can have a indication on the TOUT. For example, "TOUT 0x0010" (subject to change as per the review-comments later). In this way, TOUT may be extended across UDP as well, with one constraint that the intermediate network devices will have to currently open the payload portion 454. In this respect, the techniques described herein may achieve reduction in keep-alive message transmission using a potentially lightweight TOUT field.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
determining, by a first computing device and for a packet flow that will include data from an instance of an application executed by the first computing device, a minimum timeout value indicative of a time duration during which the first computing device is not required to send a keep-alive message to prevent an intermediate network device positioned in a service provider network between the first computing device and a second computing device from timing out the packet flow, the first computing device operating as a client of the second computing device, the second computing device positioned in a public network to which the service provider network provides access, the packet flow is from the first computing device to the second computing device, and the intermediate network device is not configured to execute, for the packet flow, as any of a host of, client of, or proxy for any of the first computing device and the second computing device;
generating, by the first computing device, either a transport control protocol (TCP) packet of the packet flow, the packet including an option field in a header of the TCP packet specifying the minimum timeout value, or a user datagram protocol (UDP) packet of the packet flow, the UDP packet including a field in a payload of the UDP packet specifying the minimum timeout value;
transmitting, by the first computing device and via the intermediate network device, either the TCP packet or the UDP packet to an application executing on the second computing device;
receiving a packet forwarded by the intermediate network device specifying an intermediate timeout value inserted, by the intermediate network device, into a TCP packet or UDP packet forwarded by the intermediate network device; and
transmitting, based on the intermediate timeout value and the minimum timeout value, subsequent packets of the packet flow.

2. The method of claim 1, wherein transmitting the subsequent packets comprises transmitting, when the intermediate timeout value is the same as the minimum timeout value, the subsequent packets of the packet flow in accordance with the minimum timeout value.

3. The method of claim 1, wherein transmitting the subsequent packets comprises:
generating, when the intermediate timeout value is not the same as the minimum timeout value, one of the subsequent packets in response to the packet forwarded by the intermediate network device specifying the intermediate timeout value in place of the minimum timeout value; and
transmitting the remaining ones of the subsequent packets of the packet flow in accordance with the intermediate timeout value.

4. The method of claim 1,
wherein the application comprises a first application,
wherein the minimum timeout value comprises a first minimum timeout value,
wherein the packet flow comprises a first packet flow, and
wherein the method further comprises:
determining, by the first computing device and for a second packet flow that will include data from an instance of a second application executed by the first computing device, a second minimum timeout value indicative of a time duration during which the first computing device is not required to send a keep-alive message to prevent an intermediate network device positioned between the first computing device and a second computing device from timing out the second packet flow, wherein the second minimum timeout value is different than the first minimum timeout value;
generating, by the first computing device, a packet of the second packet flow such that the packet from the second packet flow includes a request to the intermediate network device that the second packet flow be assigned the second minimum timeout value; and
transmitting the packet of the second packet flow to an application executing on a third computing device.

5. The method of claim 1, further comprising issuing, with the instance of the application executing on the first computing device, a kernel call to an operating system of the first computing device to register the instance of the application with the operating system and specify the minimum timeout value to be used with packet flows originated by the operating system for the instance of the application.

6. The method of claim 1,
wherein the first computing device comprises a mobile endpoint device,
wherein the service provider network comprises a wireless access network and a core network,
wherein the mobile endpoint device interfaces with the wireless access network via a wireless connection, and
wherein the intermediate network device comprises a mobile gateway positioned intermediately in the core network.

7. A first computing device comprising:
one or more processors operably coupled to a memory, and configured to:
determine, for a packet flow that will include data from an instance of an application executed by the first computing device, a minimum timeout value indicative of a time duration during which the first computing device is not required to send a keep-alive message to prevent an intermediate network device positioned in a service provider network between the first computing device and a second computing device from timing out the packet flow, the first computing device operating as a client of the second computing device, the second computing device positioned in a public network to which the service provider network provides access, the packet flow is from the first computing device to the second computing device, and the intermediate network device is not configured to execute, for the packet flow, as any of a host of, client of, or proxy for any of the first computing device and the second computing device; and
generate either a transport control protocol (TCP) packet of the packet flow, the packet including an option field in a header of the TCP packet specifying the minimum timeout value, or a user datagram protocol (UDP) packet of the packet flow, the UDP packet including a field in a payload of the UDP packet specifying the minimum timeout value; and
a network interface configured to:
transmit, via the intermediate network device, either the TCP packet or the UDP packet to an application configured to be executed by the second computing device;
receive a packet forwarded by the intermediate network device specifying an intermediate timeout value inserted, by the intermediate network device, into the TCP packet or the UDP packet forwarded by the intermediate network device; and transmit, based on the intermediate timeout value and the minimum timeout value, subsequent packets of the packet flow.

8. A method comprising:

determining, from a first packet of a packet flow that includes data from an instance of an application executed by a first computing device, a minimum timeout value for the packet flow indicative of a time duration during which the first computing device will not send a keep-alive message to prevent the packet flow from timing out, wherein the first packet comprises either a transport control protocol (TCP) packet including a header having an option field specifying the minimum timeout value or a user datagram protocol (UDP) packet including a field in a payload of the UDP packet specifying the minimum timeout value;

determining an intermediate timeout value for the packet flow based on a comparison of the minimum timeout value to a maximum timeout value, the maximum timeout value configured for use by an intermediate network device intermediately positioned in a service provider network between the first computing device and a second computing device and indicative of a maximum time duration that any given packet flow is to remain active within the intermediate network device before being timed out, the first computing device operating as a client of the second computing device, the second computing device positioned in a public network to which the service provider network provides access, the packet flow is from the first computing device to the second computing device, and the intermediate network device is not configured to execute, for the packet flow, as any of a host of, client of, or proxy for any of the first computing device and the second computing device; and specifying the intermediate timeout value in a second packet of the packet flow sent by the second computing device to the first computing device in response to the first packet.

9. The method of claim 8, wherein determining the minimum timeout value comprises determining the minimum timeout value from the optional field in the header of the TCP packet.

10. The method of claim 8, wherein determining the minimum timeout value comprises determining the minimum timeout value from the field in the payload of the UDP packet.

11. The method of claim 8, wherein determining the intermediate timeout value comprises determining the intermediate timeout value to be equal to the minimum timeout value when the minimum timeout value is less than or equal to the maximum timeout value.

12. The method of claim 8, wherein determining the intermediate timeout value comprises determining the intermediate timeout value to be equal to the maximum timeout value when the minimum timeout value is greater than the maximum timeout value.

13. The method of claim 12, further comprising receiving a third packet from the first computing device specifying the intermediate timeout value to acknowledge that the first computing device has accepted the intermediate timeout value having a value less than the minimum timeout value.

14. The method of claim 8, wherein the intermediate timeout value comprises a first intermediate timeout value, wherein the second packet includes an second intermediate timeout value specified by a different intermediate network device that is also intermediately positioned between the first computing device and the second computing device, and wherein determining the intermediate timeout value comprising determining the first intermediate timeout value to be equal to, when the second intermediate timeout value is less than both the minimum timeout value and the first intermediate timeout value, the second intermediate timeout value.

15. The method of claim 8, wherein the first computing device comprises a mobile endpoint device, wherein the service provider network comprises a wireless access network and a core network, wherein the mobile endpoint device interfaces with the wireless access network via a wireless connection, and wherein the intermediate network device comprises a mobile gateway positioned intermediately in the core network.

16. An intermediate network device comprising:

one or more processors operably coupled to a memory, configured to:

determine, from a first packet of a packet flow that includes data from an instance of an application executed by a first computing device, a minimum timeout value for the packet flow indicative of a time duration during which the first computing device will not send a keep-alive message to prevent the packet flow from timing out, wherein the first packet comprises either a transport control protocol (TCP) packet including a header having an option field specifying the minimum timeout value or a user datagram protocol (UDP) packet including a field in a payload of the UDP packet specifying the minimum timeout value;

determine an intermediate timeout value for the packet flow based on a comparison of the minimum timeout value to a maximum timeout value, the maximum timeout value configured for use by the intermediate network device intermediately positioned in a service provider network between the first computing device and a second computing device and indicative of a maximum time duration that any given packet flow is to remain active within the intermediate network device before being timed out, the first computing device operating as a client of the second computing device, the second computing device positioned in a public network to which the service provider network provides access, the packet flow is from the first computing device to the second computing device, and the intermediate network device is not configured to execute, for the packet flow, as any of a host of, client of, or proxy for any of the first computing device and the second computing device; and specify the intermediate timeout value in a second packet of the packet flow sent by the second network device to the first network device in response to the first packet.

17. The intermediate network device of claim 16, wherein the control unit is configured to determine the intermediate timeout value to be equal to the minimum timeout value when the minimum timeout value is less than or equal to the maximum timeout value.

18. The intermediate network device of claim 16, wherein the control unit is configured to determine the intermediate timeout value to be equal to the maximum timeout value when the minimum timeout value is greater than the maximum timeout value.

19. The intermediate network device of claim 18, further comprising an interface configured to receive a third packet from the first computing device specifying the intermediate timeout value to acknowledge that the first computing device has accepted the intermediate timeout value having a value less than the minimum timeout value.

20. The intermediate network device of claim 16,
   wherein the intermediate timeout value comprises a first intermediate timeout value,
   wherein the second packet includes an second intermediate timeout value specified by a different intermediate network device that is also intermediately positioned between the first computing device and the second computing device, and
   wherein the control unit is configured to determine the first intermediate timeout value to be equal to, when the second intermediate timeout value is less than both the minimum timeout value and the first intermediate timeout value, the second intermediate timeout value.

* * * * *